US010479923B2

(12) United States Patent
Patil et al.

(10) Patent No.: US 10,479,923 B2
(45) Date of Patent: Nov. 19, 2019

(54) CEMENT COMPOSITION FOR LOST CIRCULATION APPLICATION AND METHOD OF CEMENTING

(71) Applicant: Halliburton Energy Services, Inc., Houston, TX (US)

(72) Inventors: Sandip Prabhakar Patil, Pune (IN); Rahul Chandrakant Patil, Pune (IN); Krishna M. Ravi, Houston, TX (US); Sheetal Singh, Pune (IN); Trissa Joseph, Houston, TX (US); Marcus Duffy, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/907,597

(22) PCT Filed: Nov. 25, 2013

(86) PCT No.: PCT/US2013/071647
§ 371 (c)(1),
(2) Date: Jan. 26, 2016

(87) PCT Pub. No.: WO2015/076838
PCT Pub. Date: May 28, 2015

(65) Prior Publication Data
US 2016/0160109 A1 Jun. 9, 2016

(51) Int. Cl.
*E21B 33/14* (2006.01)
*C04B 28/02* (2006.01)
(Continued)

(52) U.S. Cl.
CPC ............... *C09K 8/487* (2013.01); *C04B 28/02* (2013.01); *C04B 28/04* (2013.01); *C09K 8/467* (2013.01);
(Continued)

(58) Field of Classification Search
CPC .......... E21B 33/14; E21B 33/13; C09K 8/467; C09K 2208/10; C04B 28/02
See application file for complete search history.

(56) References Cited

U.S. PATENT DOCUMENTS 3,835,926 A * 9/1974 Clement, Jr. ............ C09K 8/42
106/607
4,822,421 A 4/1989 Crabb
(Continued)

FOREIGN PATENT DOCUMENTS

CA 2774306 3/2011
EP 1900705 9/2006
(Continued)

OTHER PUBLICATIONS

Patil, Sandip P. et al, "Novel Cement Composition for Lost Circulation Application", PCT/US2013/071647 filed Nov. 25, 2013, 22 pgs.
(Continued)

*Primary Examiner* — Catherine Loikith
(74) *Attorney, Agent, or Firm* — Thomas Rooney; C. Tumey Law Group PLLC

(57) ABSTRACT

A method of cementing a subterranean formation includes providing a cement composition comprising cementitious material, aqueous base fluid, nanoparticles, synthetic clay, and a thixotropic modifier, where the solid materials are about 0 wt % to about 40 wt % of the total weight of the cement composition; introducing the cement composition into a subterranean formation; and allowing the cement composition to set in the subterranean formation. Cement compositions include cementitious material, aqueous base fluid, nanoparticles, synthetic clay, and a thixotropic modifier.

29 Claims, 1 Drawing Sheet

(51) Int. Cl.
  *C09K 8/467* (2006.01)
  *C09K 8/487* (2006.01)
  *C04B 28/04* (2006.01)
  *C04B 111/00* (2006.01)
(52) U.S. Cl.
  CPC ..... *E21B 33/14* (2013.01); *C04B 2111/00008* (2013.01)

(56) References Cited

U.S. PATENT DOCUMENTS

| | | |
|---|---|---|
| 6,279,655 B1 | 8/2001 | Pafitis et al. |
| 8,636,063 B2 | 1/2014 | Ravi et al. |
| 2005/0076812 A1 | 4/2005 | Reddy et al. |
| 2005/0204961 A1 | 9/2005 | Chatterji et al. |
| 2011/0005758 A1 | 1/2011 | Shindgikar et al. |
| 2011/0114318 A1* | 5/2011 | Ezell .................. C09K 8/5045 166/305.1 |
| 2012/0190769 A1 | 7/2012 | Patil et al. |
| 2012/0192768 A1 | 8/2012 | Ravi et al. |
| 2014/0180592 A1 | 6/2014 | Ravi et al. |

FOREIGN PATENT DOCUMENTS

| | | |
|---|---|---|
| JP | 2009518276 | 5/2009 |
| WO | WO-2012/069024 | 5/2012 |

OTHER PUBLICATIONS

"PCT International Search Report & Written Opinion", dated Aug. 26, 2014, Appl No. PCT/US2013/071647, "Novel Cement Composition for Lost Circulation Application," filed Nov. 25, 2013, 21 pgs.

THERMA-VIS™ Product Data Sheet from Halliburton Energy Services, Inc. dated 2017.

Canadian Examination Report for Application No. 2,924,991 dated Jan. 16, 2018.

Singapore Written Opinion for Application No. 11201600527T dated Apr. 12, 2018.

Japanese Written Opinion for Application No. 2016-541948 dated Nov. 9, 2018.

* cited by examiner

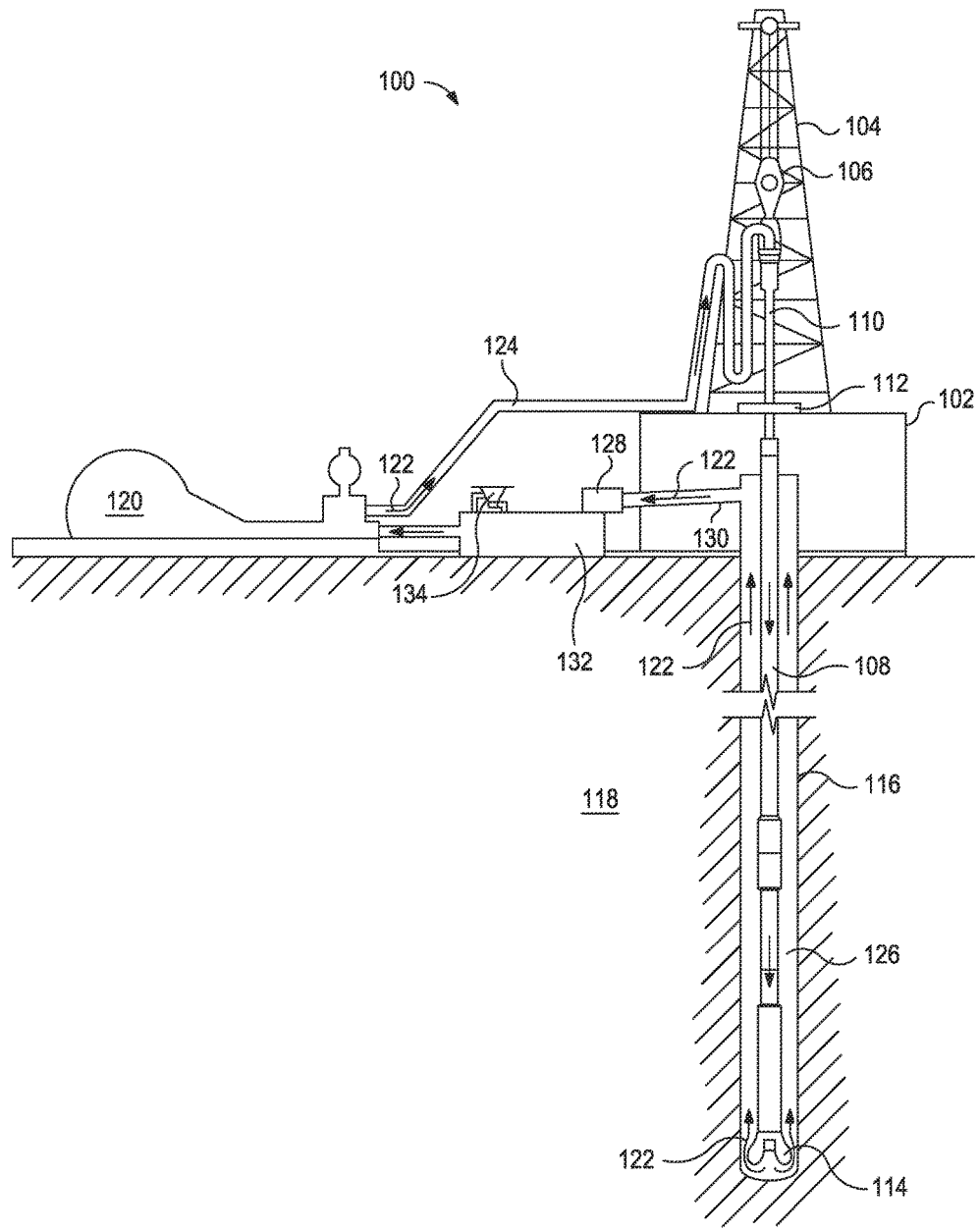

CEMENT COMPOSITION FOR LOST CIRCULATION APPLICATION AND METHOD OF CEMENTING

BACKGROUND

Cementing is a common well operation. For example, hydraulic cement compositions can be used in cementing operations in which a string of pipe, such as casing or liner, is cemented in a wellbore. The cemented string of pipe isolates different zones of the wellbore from each other and from the surface. Hydraulic cement compositions can be used in primary cementing of the casing or in completion operations. Hydraulic cement compositions can also be utilized in intervention operations, such as in plugging highly permeable zones or fractures in zones that may be producing too much water, plugging cracks or holes in pipe strings, and the like.

Cementing and Hydraulic Cement Compositions

In performing cementing, a hydraulic cement composition is pumped as a fluid (typically in the form of suspension or slurry) into a desired location in the wellbore. For example, in cementing a casing or liner, the hydraulic cement composition is pumped into the annular space between the exterior surfaces of a pipe string and the borehole (that is, the wall of the wellbore). The cement composition is allowed time to set in the annular space, thereby forming an annular sheath of hardened, substantially impermeable cement. The hardened cement supports and positions the pipe string in the wellbore and bonds the exterior surfaces of the pipe string to the walls of the wellbore.

Hydraulic cement is a material that when mixed with water hardens or sets over time because of a chemical reaction with the water. Because this is a chemical reaction with the water, hydraulic cement is capable of setting even under water. The hydraulic cement, water, and any other components are mixed to form a hydraulic cement composition in the initial state of a slurry, which should be a fluid for a sufficient time before setting for pumping the composition into the wellbore and for placement in a desired downhole location in the well.

Conventional cements may be less effective in harsh environments, particularly by using sea or brackish water, such as subterranean formations consisting of total losses. Additionally, the quality of the silicalite may also reduce the efficacy of the cement. Therefore, it is necessary to identify a cement slurry that is useful in lost circulation applications, can be mixed easily, and can handle harsh environments.

BRIEF DESCRIPTION OF THE DRAWINGS

The following figures are included to illustrate certain aspects of the present invention, and should not be viewed as exclusive embodiments. The subject matter disclosed is capable of considerable modification, alteration, and equivalents in form and function, as will occur to one having ordinary skill in the art and having the benefit of this disclosure.

FIG. 1 shows an illustrative example of an apparatus useful for cementing a wellbore with the cement compositions of the invention.

DETAILED DESCRIPTION

The present invention generally relates to the use of cement compositions in subterranean operations, and, more specifically, to cement compositions for lost circulation applications in harsh conditions and methods of using these compositions in various subterranean operations.

A novel use of synthetic clay and nano-materials is to utilize them in cement compositions for lost circulation applications. In an exemplary embodiment, a method of cementing a subterranean formation comprises providing a cement composition comprising cementitious material, aqueous base fluid, nanoparticles, synthetic clay, and a thixotropic modifier, wherein the solid materials are about 0 wt % to about 40 wt % of the total weight of the cement composition; introducing the cement composition into a subterranean formation; and allowing the cement composition to set in the subterranean formation. In an exemplary embodiment, the resulting cement has a solid material content of about 10 wt % to about 20 wt % of the total weight of the cement. In some embodiments the rheological properties of the cement composition are shear-rate dependent. The viscosity of the non-Newtonian fluid decreases with an increase in shear rate. In various embodiments, the nanoparticles comprise at least one of nano-silica, nanocarbonate, nanoalumina, and any combination thereof. In exemplary embodiments the nanoparticles are present in the amount of about 0.1 to about 5.0 gal/sack. In certain embodiments the nanoparticles have a diameter of about 2 to about 100 microns. In some embodiments, the synthetic clay is present in an amount of about 0.1% to about 3% by weight of water. Further, in an embodiment, substantially no natural clay is added to the cement composition. In exemplary embodiments, the thixotropic modifier may be selected from high surface-area silica, fumed silica, sodium silicate, silicic acid and combinations thereof. In some embodiments, the thixotropic modifier is present in the about of about 1% to about 150% bwc. In numerous embodiments, the aqueous base fluid comprises at least one of fresh water; brackish water; saltwater; and combinations thereof, and may be present in the cement composition in an amount of from about 20% to about 80% by weight of cement composition. In various embodiments, the cementitious material comprises at least one of Portland cements; gypsum cements; high alumina content cements; slag cements; high magnesia content cements; shale cements; acid/base cements; fly ash cements; zeolite cement systems; kiln dust cement systems; microfine cements; metakaolin; pumice; and combinations thereof. In other embodiments, the cement composition may further comprise at least one of resins; latex; stabilizers; silica; pozzolans; microspheres; aqueous superabsorbers; viscosifying agents; suspending agents; dispersing agents; salts; accelerants; surfactants; retardants; defoamers; settling-prevention agents; weighting materials; fluid loss control agents; elastomers; vitrified shale; gas migration control additives; formation conditioning agents; and combinations thereof.

The invention is also directed to cement compositions. In an exemplary embodiment, a well cement composition comprises: cementitious materials; aqueous base fluids; nanoparticles; synthetic clay; and a thixotropic modifier, wherein the solid materials are about 0 wt % to about 40 wt % of the total weight of the cement composition. In an exemplary embodiment, the resulting cement has a solid material content of about 10 wt % to about 20 wt % of the total weight of the cement. In some embodiments the rheological properties of the cement composition are shear-rate dependent. The viscosity of the non-newtonian fluid decreases with an increase in shear rate. In various embodiments, the nanoparticles comprise at least one of nano-silica, nanocarbonate, nanoalumina, and any combination thereof. In exemplary embodiments the nanoparticles are present in the amount of about 0.1 to about 5.0 gal/sack. In certain embodiments the nanoparticles have a diameter of about 2 to about 100 microns. In some embodiments, the synthetic clay is present in an amount of about 0.1% to about 3% by weight of water. Further, in an embodiment, substantially no natural clay is added to the cement composition. In exemplary embodiments, the thixotropic modifier may be selected from high surface-area silica, fumed silica, sodium silicate, silicic acid and combinations thereof. In some embodiments, the thixotropic modifier is present in the about of about 1% to about 150% bwc. In numerous embodiments, the aqueous base fluid comprises at least one of fresh water; brackish water; saltwater; and combinations thereof, and may be present in the cement composition in an amount of from about 20% to about 80% by weight of cement composition. In various embodiments, the cementitious material comprises at least one of Portland cements; gypsum cements; high alumina content cements; slag cements; high magnesia content cements; shale cements; acid/base cements; fly ash cements; zeolite cement systems; kiln dust cement systems; microfine cements; metakaolin; pumice; and combinations thereof. In other embodiments, the cement composition may further comprise at least one of resins; latex; stabilizers; silica; pozzolans; microspheres; aqueous superabsorbers; viscosifying agents; suspending agents; dispersing agents; salts; accelerants; surfactants; retardants; defoamers; settling-prevention agents; weighting materials; fluid loss control agents; elastomers; vitrified shale; gas migration control additives; formation conditioning agents; and combinations thereof.

The invention is also directed to a wellbore cementing system. In an embodiment, a cementing system comprises an apparatus configured to: provide a cement composition comprising cementitious material, aqueous base fluid, nanoparticles, synthetic clay, and a thixotropic modifier, wherein the solid materials are about 0 wt % to about 40 wt % of the total weight of the cement composition; introduce the cement composition into a subterranean formation; and allow the cement composition to set in the subterranean formation. In an exemplary embodiment, the resulting cement has a solid material content of about 10 wt % to about 20 wt % of the total weight of the cement. In some embodiments the rheological properties of the cement composition are shear-rate dependent. The viscosity of the non-newtonian fluid decreases with an increase in shear rate. In various embodiments, the nanoparticles comprise at least one of nano-silica, nanocarbonate, nanoalumina, and any combination thereof. In exemplary embodiments the nanoparticles are present in the amount of about 0.1 to about 5.0 gal/sack. In certain embodiments the nanoparticles have a diameter of about 2 to about 100 microns. In some embodiments, the synthetic clay is present in an amount of about 0.1% to about 3% by weight of water. Further, in an embodiment, substantially no natural clay is added to the cement composition. In exemplary embodiments, the thixotropic modifier may be selected from high surface-area silica, fumed silica, sodium silicate, silicic acid and combinations thereof. In some embodiments, the thixotropic modifier is present in the about of about 1% to about 150% bwc. In numerous embodiments, the aqueous base fluid comprises at least one of fresh water; brackish water; saltwater; and combinations thereof, and may be present in the cement composition in an amount of from about 20% to about 80% by weight of cement composition. In various embodiments, the cementitious material comprises at least one of Portland cements; gypsum cements; high alumina content cements; slag cements; high magnesia content cements; shale cements; acid/base cements; fly ash cements; zeolite cement systems; kiln dust cement systems; microfine cements; metakaolin; pumice; and combinations thereof. In other embodiments, the cement composition may further comprise at least one of resins; latex; stabilizers; silica; pozzolans; microspheres; aqueous superabsorbers; viscosifying agents; suspending agents; dispersing agents; salts; accelerants; surfactants; retardants; defoamers; settling-prevention agents; weighting materials; fluid loss control agents; elastomers; vitrified shale; gas migration control additives; formation conditioning agents; and combinations thereof.

Nano Materials

Nanostructured materials useful in the present invention include nano-silica, nanocarbonate, nanoalumina, and any combination thereof. Exemplary embodiments of the cement compositions comprise nano-silica. The nano-silica may be described as particulate nano-silica. That is, the nano-silica may be particulate in nature and not, for example, a colloidal silica or a suspension of silica in solution. Indeed, in one embodiment, the particulate nano-silica may be added to the cement composition as a dry nano-silica powder. Generally, the particulate nano-silica may be defined as nano-silica having a particle size of less than or equal to about 100 nanometers ("nm"). For example, the particulate nano-silica may have a particle size in the range of from about 1 nm to about 100 nm. In certain exemplary embodiments, the particulate nano-silica may have a particle size of less than or equal to about 50 nm. For example, the particulate nano-silica may have a particle size in the range of from about 5 nm to about 50 nm. In further exemplary embodiments, the particulate nano-silica may have a particle size of less than or equal to about 30 nm. For example, the particulate nano-silica may have a particle size in the range of from about 5 nm to about 30 nm. However, it should be noted that the particulate nano-silica may be utilized in combination with differently sized silica particles in accordance with present embodiments. For example, a number of silica particles with particle sizes greater than 100 nm may be included in a cement composition in accordance with present embodiments.

The particulate nano-silica utilized with present embodiments, which may include silicon dioxide, may have an impact on certain physical characteristics of resulting cements. For example, relative to inclusion of colloidal silica or larger silica particles in a cement slurry, inclusion of particulate nano-silica in the cement slurry may provide improved mechanical properties, such as compressive strength, tensile strength, Young's modulus and Poisson's ratio. In addition, the particulate nano-silica also may be included in the cement composition as a set accelerator to accelerate the set time of the resultant cement composition. Accordingly, a cement composition in accordance with present embodiments may comprise a sufficient amount of particulate nano-silica to provide the desired characteristics in a resulting cement, hi exemplary embodiments, the particulate nano-silica may be present in the cement composition in an amount in the range of from about 0.1 to about 5 gps. In exemplary embodiments, the particulate nano-silica may be present in the cement composition in an amount in the range of from about 0.5 to about 3.0 gps. While the nano-particles may include nano-silica, it should be understood that the cement composition may comprise less than about 25% silica bwoc, in accordance with embodiments of the present invention.

It may be desirable to utilize other types of nano-materials, in accordance with embodiments of the present invention. Examples of such nano-particles include nanoalumina, nanocarbonate, and combinations thereof. In certain exemplary embodiments, the nano-particles may be particulate in nature and not, for example, a colloidal nano-particle or a suspension of the nano-particle in solution. Furthermore, while the preceding discussion is directed to the use of particulate nano-silica in well cementing methods, those of ordinary skill in the art will appreciate that the present technique also encompasses the use of nano-particles in any of a variety of different subterranean treatments.

Aqueous Base Fluids

An aqueous base fluid in the cement compositions of the invention is present in an amount sufficient to make a slurry which is pumpable for introduction down hole. In some embodiments, the aqueous base fluid comprises at least one of fresh water; brackish water; saltwater; and combinations thereof. The water may be fresh water, brackish water, saltwater, or any combination thereof. In certain embodiments, the water may be present in the cement composition in an amount of from about 20% to about 95% by weight of cement composition, from about 28% to about 90% by wt. of cement composition, or from about 36% to about 80% by wt. of cement composition.

Synthetic Clay

Synthetic clays are present in the cement compositions of the invention. Examples of suitable synthetic clays include, without limitation, layered silicates such as Laponite™ EP, available from Rockwood Additives Limited, Widnes, Cheshire, UK. In some embodiments, the cements of the present invention do not include the addition of a natural clay. In certain embodiments, the synthetic clays are present in the amount of about 0.1 to about 3.0% ww.

Thixotropic Modifiers

Thixotropic modifiers are present in the cement compositions of the invention. Examples of suitable thixotropic modifiers include finely divided, high surface-area silica, fumed silica, sodium silicate, silicic acid, and combinations thereof. A commercial version is Microblock™, available from Halliburton Energy Services, Inc., Houston, Tex. Econolite™ is a cement additive, available from Halliburton Energy Services, Inc., Houston, Tex., that may also impart thixotropy to a cement slurry. GasCon™ 469, a lightweight cement additive useful as a thixotropic modifier, is available from Halliburton Energy Services, Inc., Houston, Tex., and may be defined as a colloidal silicic acid suspension containing suspended silicic acid particles generally having a particle size of less than about 20 nm. In certain embodiments, the thixotropic modifiers are present in the amount of about 0.1% to about 150% bwc.

Cementitious Material

A variety of cements can be used in the present invention, including cements comprised of calcium, aluminum, silicon, oxygen, and/or sulfur which set and harden by reaction with water. Such hydraulic cements include Portland cements, gypsum cements, high alumina content cements, slag cements, high magnesia content cements, shale cements, acid/base cements, fly ash cements, zeolite cement systems, kiln dust cement systems, microfine cements, metakaolin, pumice and their combinations. In some embodiments, the suitable API Portland cements are from Classes A, C, H, and G.

Slurry Density

In certain embodiments, the cement compositions have a slurry density which is pumpable for introduction down hole. In exemplary embodiments, the density of the cement composition in slurry form is from about 7 pounds per gallon (ppg) to about 20 ppg, from about 8 ppg to about 18 ppg, or from about 9 ppg to about 17 ppg.

Cement Additives

The cement compositions of the invention may contain additives. In certain embodiments, the additives comprise at least one of resins, latex, stabilizers, silica, pozzolans, microspheres, aqueous superabsorbers, viscosifying agents, suspending agents, dispersing agents, salts, accelerants, surfactants, retardants, defoamers, settling-prevention agents, weighting materials, fluid loss control agents, elastomers, vitrified shale, gas migration control additives, formation conditioning agents, and combinations thereof.

The exemplary cement compositions disclosed herein may directly or indirectly affect one or more components or pieces of equipment associated with the preparation, delivery, recapture, recycling, reuse, and/or disposal of the disclosed cement compositions. For example, and with reference to FIG. 1, the disclosed cement compositions may directly or indirectly affect one or more components or pieces of equipment associated with an exemplary wellbore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is tached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the borehole 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the scope of the disclosure.

One or more of the disclosed cement compositions may be added to the drilling fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the disclosed cement compositions may be added to the drilling fluid 122 at any other location in the drilling assembly 100. In at least one embodiment, for example, there could be more than one retention pit 132, such as multiple retention pits 132 in series. Moreover, the retention put 132 may be representative of one or more fluid storage facilities and/or units where the disclosed cement compositions may be stored, reconditioned, and/or regulated until added to the drilling fluid 122.

As mentioned above, the disclosed cement compositions may directly or indirectly affect the components and equipment of the drilling assembly 100. For example, the disclosed cement compositions may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, any fluid reclamation equipment. The fluid processing unit(s) 128 may further include one or more sensors, gauges, pumps, compressors, and the like used store, monitor, regulate, and/or recondition the exemplary cement compositions.

The disclosed cement compositions may directly or indirectly affect the pump 120, which representatively includes any conduits, pipelines, trucks, tubulars, and/or pipes used to fluidically convey the cement compositions downhole, any pumps, compressors, or motors (e.g., topside or downhole) used to drive the cement compositions into motion, any valves or related joints used to regulate the pressure or flow rate of the cement compositions, and any sensors (i.e., pressure, temperature, flow rate, etc.), gauges, and/or combinations thereof, and the like. The disclosed cement compositions may also directly or indirectly affect the mixing hopper 134 and the retention pit 132 and their assorted variations.

The disclosed cement compositions may also directly or indirectly affect the various downhole equipment and tools that may come into contact with the cement compositions such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The disclosed cement compositions may also directly or indirectly affect any downhole heat exchangers, valves and corresponding actuation devices, tool seals, packers and other wellbore isolation devices or components, and the like associated with the wellbore 116. The disclosed cement compositions may also directly or indirectly affect the drill bit 114, which may include, but is not limited to, roller cone bits, PDC bits, natural diamond bits, any hole openers, reamers, coring bits, etc.

While not specifically illustrated herein, the disclosed cement compositions may also directly or indirectly affect any transport or delivery equipment used to convey the cement compositions to the drilling assembly 100 such as, for example, any transport vessels, conduits, pipelines, trucks, tubulars, and/or pipes used to fluidically move the cement compositions from one location to another, any pumps, compressors, or motors used to drive the cement compositions into motion, any valves or related joints used to regulate the pressure or flow rate of the cement compositions, and any sensors (i.e., pressure and temperature), gauges, and/or combinations thereof, and the like.

The invention having been generally described, the following examples are given as particular embodiments of the invention and to demonstrate the practice and advantages hereof. It is understood that the examples are given by way of illustration and are not intended to limit the specification or the claims to follow in any manner.

EXAMPLES

Slurry Preparation

Fourteen different cement slurries (Slurry 1-Slurry 14) were prepared. The slurries were prepared by hydrating the clay into the water at 4000 rpm in a Waring blender, and then by adding cement, micro matrix cement, nano silica, Microblock™ and Econolite™ to the mixing water to form the respective slurry. The slurries were then tested to determine various physical properties of the different slurries. All tests were performed using API RP-10B-2, July 2010.

TABLE 1

Slurry Designs with Rheology and Gel Strength

| Material | Slurry 1 | Slurry 2 | Slurry 3 | Slurry 4 |
|---|---|---|---|---|
| Class G Cement | 100 | 100 | 100 | 100 |
| Laponite ™ EP % ww | 1 | 2 | 2 | 2 |
| Nanosilica gps | — | — | 1 | — |
| Microblock ™ gps | — | — | — | 10 |
| Water gps | 35.4 | 35.5 | 35.73 | 48.53 |
| Rheology on FYSA | 110° F. | 110° F. | 110° F. | 110° F. |
| 3 | 2 | 5 | 19 | 32 |
| 6 | 3 | 7 | 20 | 34 |
| 100 | 10 | 13 | 24 | 48 |
| 200 | 12 | 17 | 27 | 54 |
| 300 | 18 | 21 | 30 | 64 |
| 10 sec gel lbf/100 ft$^2$ | 3 | 7 | 19 | 34 |
| 10 min gel lbf/100 ft$^2$ | 18 | 34 | 41 | 54 |

(A) Effect of Chloride Content in Water on Slurry Property

To determine the effect of chloride content present in the water on the cements, a cement mixture including Laponite™ EP was made according to Table 2. The results, including gel strength, are summarized in Table 3.

TABLE 2

Slurry Design of Laponite EP

| Material | Slurry 5 |
|---|---|
| Class G Cement % bwc | 100 |
| Micro Matrix ™ Cement % bwc | 20 |
| Laponite ™ EP % ww | 1.5 |
| Nanosilica gps | 1.5 |
| Microblock ™ gps | 4 |
| Econolite ™ Liquid gps | 0.5 |
| Water gps | 47.71 |

TABLE 3

Effect of Chloride Content in Water on Rheology and Gel Strength

| | Slurry 5 | | | | | |
|---|---|---|---|---|---|---|
| FFYSA | Fresh Water | | 2000 ppm Chloride Water | | Sea Water | |
| rpm | 80° F. | 120° F. | 80° F. | 120° F. | 80° F. | 120° F. |
| 300 | 70 | 65 | 70 | 75 | 55 | 50 |
| 200 | 55 | 60 | 55 | 60 | 50 | 40 |
| 100 | 50 | 55 | 50 | 60 | 50 | 45 |
| 60 | 43 | 45 | 45 | 45 | 40 | 30 |
| 30 | 40 | 40 | 43 | 45 | 35 | 25 |
| 6 | 35 | 30 | 35 | 35 | 35 | 20 |
| 3 | 35 | 30 | 35 | 35 | 35 | 20 |
| 10 sec gel | 35 | 30 | 38 | 42 | 57 | 20 |
| 10 Min gel | 70 | 90 | 85 | 100 | 125 | 70 |

Laponite™ EP shows good gel strength reading in fresh water as well as sea water.

(B) Additional Slurry Designs with Laponite™ EP

The following Table 4 summarizes different slurry mixtures including Laponite EP and fresh water. Table 5 shows the rheological properties.

TABLE 4

Different Slurry Designs of Laponite ™ EP

| Material | Slurry 6 | Slurry 7 | Slurry 8 |
|---|---|---|---|
| Class G Cement % bwc | 100 | 100 | 100 |
| Micro Matrix ™ Cement % bwc | 10 | 13 | 13 |
| Silicalite ™ % bwc | 40 | 50 | 30 |
| Nanosilica gps | 1.5 | 1.5 | 1.5 |
| Laponite ™ EP % bww | 1.5 | 1.5 | 1.5 |
| SA-1015 ™ % bwc | 0.1 | 0.1 | 0.1 |
| Metakaolin % bwc | — | — | 20 |
| Fresh Water gps | 51.7 | 46.1 | 47 |

TABLE 5

Rheology on FYSA

| | Slurry 6 | Slurry 7 | Slurry 8 |
|---|---|---|---|
| F1 Bob | 190° F. | 190° F. | 190° F. |
| 3 | 14 | 6 | 7 |
| 6 | 15 | 7 | 8 |
| 100 | 40 | 21 | 19 |
| 200 | 48 | 28 | 22 |
| 300 | 52 | 29 | 23 |

The following Table 6 summarizes different slurry mixtures including Laponite™ EP in fresh and salt water. Table 7 shows the rheological properties and gel strength.

TABLE 6

Different Slurry Designs of Laponite ™ EP in Fresh Water and Sea Water

| Material | Slurry 9 | Slurry 10 | Slurry 11 | Slurry 12 | Slurry 13 | Slurry 14 |
|---|---|---|---|---|---|---|
| Class G Cement % bwc | 100 | 100 | 100 | 100 | 100 | 100 |
| Micro Matrix ™ Cement % bwc | 10 | 13 | 13 | 13 | 13 | 13 |
| Silicalite ™ % bwc | 40 | — | — | — | — | — |
| Nanosilica gps | 1.5 | 1.5 | 1.5 | 1.5 | 1.5 | 1.5 |
| Laponite ™ EP % bww | 1.5 | 1.5 | 1.5 | 1.5 | 1.5 | 1.5 |
| Metakaolin % bwc | — | 50 | 50 | — | — | — |
| GGBF Slag % bwc | — | — | — | 50 | — | — |
| GasCon ™ 469 % bwc | — | — | — | — | 5 | — |
| Microblock ™ gps | — | — | — | — | — | 4 |
| Fresh Water gps | 51.7 | 48.5 | — | — | — | — |
| Sea Water gps | — | — | 56.4 | 57.2 | 36.0 | 43.8 |

TABLE 7

Rheology and Gel Strength on FYSA

| | Slurry 9 | Slurry 10 | Slurry 11 | Slurry 12 | | Slurry 13 | | Slurry 14 | |
|---|---|---|---|---|---|---|---|---|---|
| FYSA | 190° F. | 190° F. | 190° F. | 80° F. | 190° F. | 80° F. | 190° F. | 80° F. | 190° F. |
| 3 | 34 | 25 | 10 | 12 | 3 | 17 | 24 | 15 | 7 |
| 6 | 32 | 22 | 9 | 13 | 4 | 18 | 19 | 13 | 5 |
| 100 | 39 | 27 | 11 | 15 | 6 | 25 | 17 | 21 | 9 |
| 200 | 40 | 33 | 12 | 18 | 8 | 29 | 18 | 22 | 14 |
| 300 | 39 | 37 | 16 | 21 | 13 | 30 | 21 | 25 | 18 |
| 10 sec gel | 34 | 13 | 15 | 10 | 6 | 17 | 10 | 14 | 10 |
| 10 Min gel | 294 | 240 | 300+ | 91 | 26 | 27 | 300+ | 70 | 32 |

Econolite™ is a cement additive to increase volume and decrease density, available from Halliburton Energy Services, Inc., Houston, Tex. GGBF Slag is ground-granulated-blast-furnace Slag. Micro Matrix™ cement is an ultrafine cement, available from Halliburton Energy Services, Inc., Houston, Tex., and useful for cementing where penetration of small cracks is required. SA1015™ is a cement additive which acts as a suspending agent, available from Halliburton Energy Services, Inc., Houston, Tex. Silicalite™ cement additive is made from a finely divided, high surface-area silica, available from Halliburton Energy Services, Inc., Houston, Tex., and may impart thixotropy to some cement slurries.

As seen in the examples above, the cements of the present invention have improved rheological and thixotropic properties. The resulting cements have a low solid content, are shear dependent, and are effective over a wide temperature range.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Use of the term "optionally" with respect to any element of a claim is intended to mean that the subject element is required, or alternatively, is not required. Both alternatives are intended to be within the scope of the claim.

Numerous other modifications, equivalents, and alternatives, will become apparent to those skilled in the art once the above disclosure is fully appreciated. It is intended that the following claims be interpreted to embrace all such modifications, equivalents, and alternatives where applicable.

What is claimed is:

1. A method of cementing a subterranean formation comprising:
   preparing a cement composition comprising:
      an aqueous base fluid; and
      solid materials comprising:
         a microfine cement;
         nanoparticles comprising nano-silica;
         a synthetic clay; and
      a thixotropic modifier, wherein the thixotropic modifier is selected from sodium silicate, silicic acid, and combinations thereof, wherein the thixotropic modifier is present in an amount of about 0.1% to about 5% by weight of a cementitious material;
   introducing the cement composition into a subterranean formation; and
   allowing the cement composition to set into the subterranean formation.

2. The method of claim 1, wherein the solid materials are about 10 wt % to about 20 wt % of the total weight of the cement composition.

3. The method of claim 1, wherein the nanoparticles further comprise at least one of nanocarbonate, nanoalumina, and any combination thereof.

4. The method of claim 1, wherein the nanoparticles are present in the amount of about 0.1 to about 5 gal/sack.

5. The method of claim 1, wherein the nanoparticles have a diameter of about 2 to about 100 microns.

6. The method of claim 1, wherein the synthetic clay is present in an amount of about 0.1% to about 3.0% by weight of water.

7. The method of claim 1, wherein substantially no natural clay is added to the cement composition.

8. The method of claim 1, wherein the aqueous base fluid comprises at least one of fresh water; brackish water; saltwater; and combinations thereof.

9. The method of claim 1, wherein the aqueous bas fluid is present in the cement composition in an amount of from about 20% to about 80% by weight of cement.

10. The method of claim 1, wherein the cement composition further comprises at least one cementitious material selected from the group consisting of Portland cements; gypsum cements; high alumina content cements; slag cements; high magnesia content cements; shale cements; acid/base cements; fly ash cements; zeolite cement systems; kiln dust cement systems; metakaolin; pumice; and combinations thereof.

11. The method of claim 1, further comprising at least one of resins; latex; stabilizers; silica; pozzolans; microspheres; aqueous superabsorbers; viscosifying agents; suspending agents; dispersing agents; salts; accelerants; surfactants; retardants; defoamers; settling-prevention agents; weighting materials; fluid loss control agents; elastomers; vitrified shale; gas migration control additives; formation conditioning agents; and combinations thereof.

12. The method of claim 1, wherein a density of the cement composition before curing is less than about 12 pounds per gallon.

13. The method of claim 1, wherein the thixotropic modifier is present in the amount of about 0.1% to about 150% bwc.

14. The method of claim 1, wherein the nanoparticles are particulate and added in the preparing step as a dry nano-silica powder, and wherein solid materials are about 0 wt % to about 40 wt % of a total weight of the cement composition.

15. A well cement composition comprising:
   an aqueous base fluid;
   solid materials comprising:
      a microtine cement;
      nanoparticles comprising nano-silica;
      a synthetic clay; and
      a thixotropic modifier, wherein the thixotropic modifier is selected from sodium silicate, silicic acid, and combinations thereof, wherein the thixotropic modifier is present in an amount of about 0.1% to about 5% by weight of a cementitious material.

16. The cement composition of claim 15, wherein the solid materials are about 10 wt % to about 20 wt % of the total weight of the cement composition.

17. The cement composition of claim 15, wherein the nanoparticles further comprise at least one of nanocarbonate, nanoalumina, and any combination thereof.

18. The cement composition of claim 15, wherein the nanoparticles are present in the amount of about 0.1 to about 5 gal/sack.

19. The cement composition of claim 15, wherein the nanoparticles have a diameter of about 2 to about 100 microns.

20. The cement composition of claim 15, wherein the synthetic clay is present in an amount of 0.1% to about 3.0% by weight of water.

21. The cement composition of claim 15, wherein substantially no natural clay is added to the cement composition.

22. The cement composition of claim 15, wherein the aqueous base fluid comprises at least one of fresh water; brackish water; saltwater; and combinations thereof.

23. The cement composition of claim 15, wherein the aqueous base fluid is present in the cement composition in an amount of from about 20% to about 80% by weight of cement.

24. The cement composition of claim 15, wherein the cement composition further comprises at least one cementitious material selected from the group consisting of Portland cements; gypsum cements; high alumina content cements; slag cements; high magnesia content cements; shale cements; acid/base cements; fly ash cements; zeolite cement systems; kiln dust cement systems; metakaolin; pumice; and combinations thereof.

25. The cement composition of claim 15, further comprising at least one of resins; latex;
   stabilizers; silica; pozzolans; microspheres; aqueous superabsorbers; viscosifying agents;
   suspending agents; dispersing agents; salts; accelerants; surfactants; retardants; defoamers;
   settling-prevention agents; weighting materials; fluid loss control agents; elastomers; vitrified shale; gas migration control additives; formation conditioning agents; and combinations thereof.

26. The cement composition of claim 15, wherein a density of the cement composition before curing is less than about 12 pounds per gallon.

27. The cement composition of claim 15, wherein the thixotropic modifier is present in the amount of about 0.1% to about 150% bwc.

28. The cement composition of claim 15, wherein the nanoparticles are particulate and added in the preparing step as a dry nano-silica powder, and wherein solid materials are about 0 wt % to about 40 wt % of a total weight of the cement composition.

29. A wellbore cementing system comprising:
   a mixing apparatus;
   an aqueous base fluid; and
   solid materials comprising
      a microtine cement;
      nanoparticles comprising nano-silica;
      a synthetic clay; and
      a thixotropic modifier, wherein the thixotropic modifier is selected from sodium silicate, silicic acid, and combinations thereof, wherein the thixotropic modifier is present in an amount of about 0.1% to about 5% by weight of a cementitious material;
   a conduit connected to a wellbore;
   a pump connected to the mixing apparatus and the conduit.

* * * * *